United States Patent
Biel et al.

(10) Patent No.: US 9,796,145 B2
(45) Date of Patent: Oct. 24, 2017

(54) APPARATUS FOR REMOVING AN OPHTHALMIC LENS FROM A MOLD HALF

(71) Applicant: Novartis AG, Basel (CH)

(72) Inventors: Roger Biel, Aschaffenburg (DE); Günter Lässig, Obernburg (DE)

(73) Assignee: NOVARTIS AG, Basel (CH)

( * ) Notice: Subject to any disclaimer, the term of this patent is extended or adjusted under 35 U.S.C. 154(b) by 142 days.

(21) Appl. No.: 14/976,356

(22) Filed: Dec. 21, 2015

(65) Prior Publication Data

US 2016/0167322 A1    Jun. 16, 2016

Related U.S. Application Data

(62) Division of application No. 12/542,754, filed on Aug. 18, 2009, now Pat. No. 9,254,616.

(30) Foreign Application Priority Data

Aug. 20, 2008    (EP) .................................... 08162663

(51) Int. Cl.
| | | |
|---|---|---|
| *B29D 11/00* | (2006.01) | |
| *B29C 37/00* | (2006.01) | |
| *B25J 15/06* | (2006.01) | |
| *B65G 47/91* | (2006.01) | |
| *B29L 11/00* | (2006.01) | |
| *B29K 83/00* | (2006.01) | |

(52) U.S. Cl.
CPC ....... *B29D 11/0024* (2013.01); *B25J 15/0616* (2013.01); *B29C 37/0007* (2013.01); *B29D 11/00192* (2013.01); *B65G 47/912* (2013.01); *B29K 2083/00* (2013.01); *B29K 2995/0058* (2013.01); *B29L 2011/0041* (2013.01)

(58) Field of Classification Search
CPC .......... B29D 11/0024; B29D 11/00192; B65G 47/912; B29C 37/0007; B25J 15/0616; B29L 2011/0041
See application file for complete search history.

(56) References Cited

U.S. PATENT DOCUMENTS

| | | |
|---|---|---|
| 6,432,217 B1 | 8/2002 | Baxter |
| 6,494,021 B1 | 12/2002 | Schlagel |
| 6,502,876 B1 | 1/2003 | Stockhorst |

FOREIGN PATENT DOCUMENTS

| | | |
|---|---|---|
| EP | 1029789 A2 | 8/2000 |
| JP | 07009509 A | 1/2007 |
| WO | WO2008074541 A1 | 6/2008 |

OTHER PUBLICATIONS

PCT International Search Report dated Nov. 4, 2009.
PCT Written Opinion of the International Searching Authority dated Nov. 4, 2009.

*Primary Examiner* — Yogendra Gupta
*Assistant Examiner* — Ninh Le
(74) *Attorney, Agent, or Firm* — Robert A. Ambrose

(57) ABSTRACT

An apparatus (1;2) for removing an ophthalmic lens from a mold half (3;4), comprises a ring member (10;20) movable towards and away from the mold half (3;4), the ring member (10;20) comprising a central opening (103;203) and a plurality of nozzles (100;200) circumferentially distributed about the ring member (10;20), each nozzle (100;200) having an outlet opening directed towards the mold half (3,4) as the ring member (10;20) is placed on the mold half (3;4), and a gripper member (11;21) arranged to be movable towards and away from the mold half (3:4) through the central opening (103;203) of the ring member (10;20).

3 Claims, 5 Drawing Sheets

APPARATUS FOR REMOVING AN OPHTHALMIC LENS FROM A MOLD HALF

RELATED APPLICATIONS

This application is a Divisional of U.S. patent application Ser. No. 12/542,754 filed Aug. 18, 2009, now U.S. Pat. No. 9,254,616, which claims benefit under 35 U.S.C. §119 of European Patent Application No. 08162663.2, filed on Aug. 20, 2008, the contents of each of which are incorporated herein by reference in their entireties.

FIELD

The present invention relates to a gripper for removing an ophthalmic lens from a mold half. More particular, the invention relates to a gripper for removing a contact lens, especially a soft contact lens, from a mold half.

BACKGROUND

In ophthalmic lens production, particularly in contact lens production, and especially in the production of single wear contact lenses, the lenses are produced in a highly automated process. Such processes are well-known in the art. In one such process, a starting material is dispensed into a female mold half and then the mold is closed with the aid of the corresponding male mold half so as to form a mold cavity between the two mold halves. The mold cavity so formed has the shape of the contact lens to be produced. The starting material in the mold cavity is then polymerized and/or crosslinked so as to form the contact lens. Subsequently, the mold is opened and the contact lens is removed from the mold half to which it adheres for further processing.

The contact lenses are typically removed from the mold half with the aid of a vacuum gripper. However, one of the observations made during production of contact lenses in such a process is that conventional vacuum grippers are not in all cases capable of reliably removing the lens from the respective mold half. Even if they succeed, it may occur that a contact lens is damaged due to too high mechanical forces applied to the contact lens. This holds in particular for, but is not limited to, contact lenses made from silicon hydrogel materials. Such contact lenses strongly adhere to the mold half.

It is therefore an object of the invention to suggest an apparatus which allows for reliably removing a contact lens from the mold half and which avoids damage to the lens due to excess mechanical forces applied to the lens. In particular, such gripper should be capable of removing contact lenses made from silicon hydrogel materials from a mold half. In addition, the apparatus should be capable of being used in a highly automated production process.

SUMMARY

This object is achieved by the apparatus according to the invention as it is specified by the features of the independent claim. More specific embodiments of the apparatus according to the invention are the subject of the dependent claims.

In particular, the apparatus for removing an ophthalmic lens from a mold half according to the invention comprises a ring member movable towards and away from the mold half. The ring member comprises a central opening and a plurality of nozzles circumferentially distributed about the ring member. Each nozzle has an outlet opening directed towards the mold half as the ring member is placed on the mold half. The apparatus further comprises a gripper member arranged to be movable towards and away from the mold half through the central opening of the ring member.

Accordingly, the apparatus comprises a nozzle ring member that can be placed on the mold half and a gripper member that can be moved to a position directly adjacent to the ophthalmic lens that adheres to the mold half. Since the lens may adhere either to the male or to the female mold half, after opening of the mold it is determined whether the lens adheres to the male mold half or to the female mold half and then the gripper member is moved to the respective mold half to which the lens adheres. Alternatively, nozzle ring members and gripper members are provided for both the male mold half and the female mold half of a mold and are automatically moved to the male mold half and to the female mold half. A fluid such as water or air, can be ejected through the outlet openings of the nozzles so as to loosen the lens from the mold half to which it adheres. At the same time or even before, vacuum or negative pressure can be applied to the gripper member so as to allow the loosened lens to be suctionally engaged by the gripper member. After that, ejection of the fluid can be terminated while vacuum is still applied to the gripper member. The gripper member together with the lens can then be moved away from the mold half through the central opening of the ring member and can subsequently be moved to a lens deposition position. Having reached the lens deposition position, the suction is released and/or positive overpressure can be applied to the gripper member thus releasing the lens from the gripper and depositing it into a container, for example, for further processing or packaging.

Such a gripper allows to reliably loosen the lens from the mold half and to transfer it to the gripper member without causing damage to the lens due to excess mechanical forces applied to the lens. The loosening of the lens with the aid of the fluid ejected through the outlet openings of the nozzles allows the gripper to detach the loosened lens from the mold using mild suction without applying excess mechanical forces that might damage the lens. Also, the gripper is suitable to be used in a highly automated process, since all actions to be performed can optionally be fully automated and controlled with a suitable control unit.

In one embodiment of the apparatus according to the invention, the gripper member comprises an attachment surface which is provided with holes and a channel which is connected to and is in fluid communication with the holes provided in the attachment surface in order to allow suction or overpressure to be applied for gripping or releasing the ophthalmic lens. This is a simple embodiment of a gripper member from a constructional point of view.

In a further embodiment of the apparatus according to the invention, the ring member further comprises a sealing member which is arranged such that it provides a seal for the mold half preventing fluid from escaping as the ring member is placed on the mold half. This embodiment is advantageous inasmuch as no fluid is spilled during loosening and removing the lens.

Since ophthalmic lenses and in particular contact lenses are medical articles, in a further embodiment the ring member and the gripper member are made from a material which is resistant to corrosion, e.g. stainless steel or a suitable plastics material. When producing medical articles, such as ophthalmic lenses and in particular contact lenses, it is important to maintain clean conditions in the production process so as to avoid contamination of the lenses produced.

Another aspect of the present invention is related to a method for removing an ophthalmic lens from a mold half. This method comprises the steps of:

moving a ring member comprising a central opening and a plurality of nozzles circumferentially distributed thereabout towards a mold half carrying an ophthalmic lens, such that the ring member is placed on the mold half, moving a gripper member towards the mold half through the central opening of the ring member such that the gripper member is arranged directly adjacent to the mold half, applying suction through the gripper member, ejecting a fluid through the outlet openings of the nozzles towards the mold half so as to loosen the ophthalmic lens to allow it to be suctionally engaged by the gripper member, and moving the gripper member together with the ophthalmic lens away from the mold half through the central opening of the ring member.

After the (nozzle) ring member has been placed on the mold half carrying the ophthalmic lens, suction is applied to the gripper member. However, the suction applied is at least not strong enough to alone remove a lens that strongly adheres to a mold half, since this may lead to damaging of the lens. Rather, a fluid such as water or air is ejected from the nozzles of the ring member so as to loosen the lens adhering to the mold half. As the lens has been loosened, the suction causes the lens to be gripped by the gripper member. The gripper member together with the lens attached thereto can then be moved away from the mold half through the central opening of the ring member. This enables a more gentle and "smooth" but reliable removal of the lens from the mold half even when materials are used which cause the lens to strongly adhere to the mold half, such as silicon hydrogel materials.

In a further variant of the method according to the invention, ejection of the fluid through the outlet openings of the nozzles is terminated prior to moving the gripper member together with the ophthalmic lens away from the mold half. This avoids wasting additional fluid after the lens has already been loosened and suctionally engaged by the gripper member.

In a still further variant of the method according to the invention, the gripper member together with the ophthalmic lens is moved towards a lens deposition position, where the lens is released from the gripper member by releasing the suction and/or by applying positive overpressure through the gripper member. This variant allows the lens to be directly deposited at a desired location where it can be further processed or packaged.

In a still further variant of the method according to the invention, the ring member is moved away from the mold half after moving the gripper member away from the mold half, but prior to moving the gripper member towards the deposition position. This variant enables the mold half to be transported away, e.g. to be cleaned and reused, after the lens has been removed from the mold half. As the next mold half carrying an ophthalmic lens is moved so as to be located under the gripper, the process can start anew; that is to say, the ring member is placed on the mold half, the gripper is moved to be located directly adjacent to the mold half, etc. As already mentioned above, the fluid to be ejected through the outlet openings of the nozzles may advantageously be water, however, other suitable fluids are also conceivable (e.g. air, nitrogen, and/or various other liquids and/or gases).

BRIEF DESCRIPTION OF THE DRAWINGS

Further advantageous aspects of the invention will become apparent from the following description of preferred embodiments with the aid of the drawings in which.

DETAILED DESCRIPTION

Figure 1:
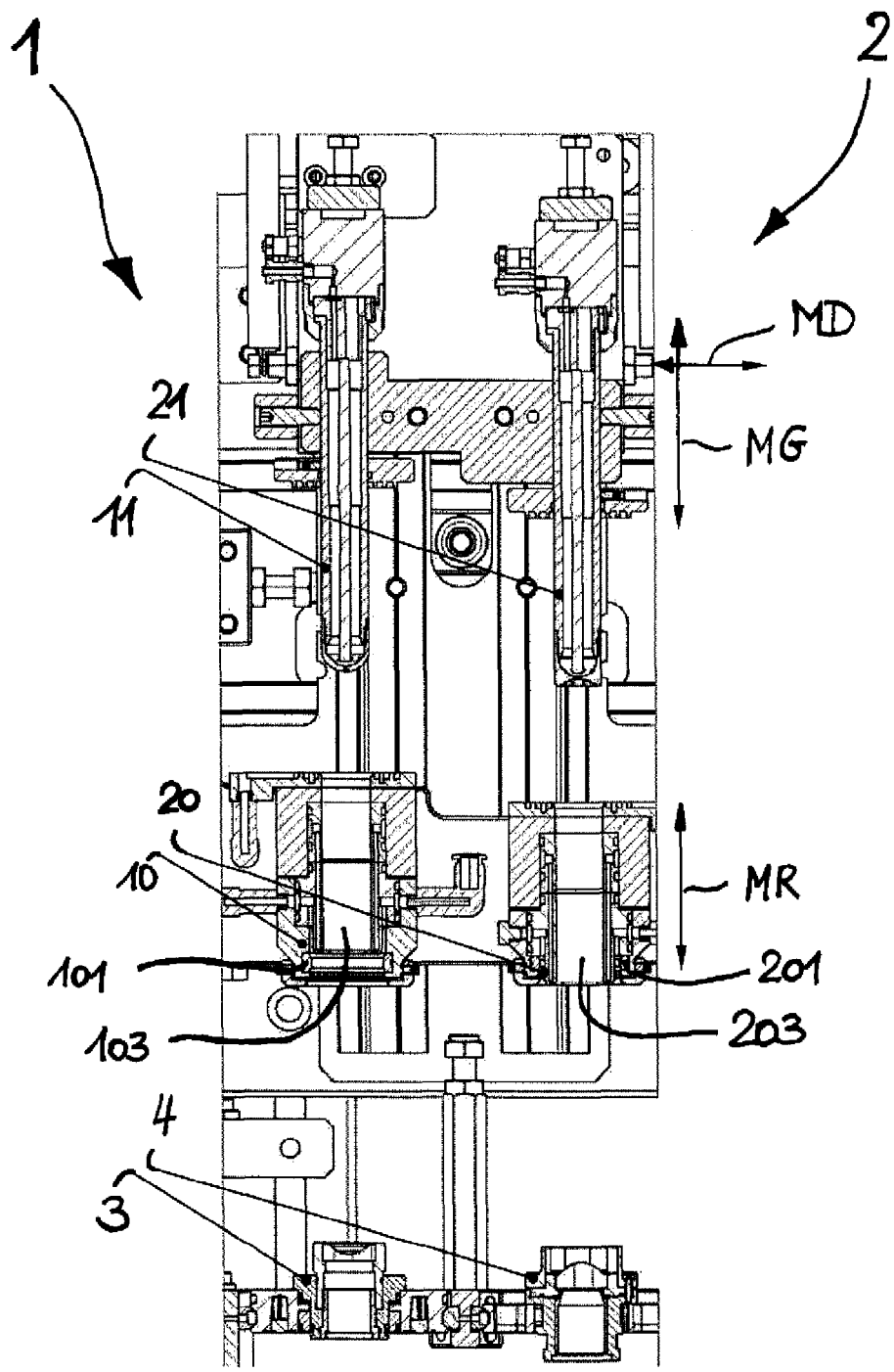
FIG. 1 shows an embodiment of an apparatus according to the invention comprising a pair of grippers—one male gripper and one female gripper—in a starting position above respective female and male mold halves.

In FIG. 1 an embodiment of the apparatus according to the invention comprising a pair of grippers 1,2 is shown, the grippers 1,2 being arranged in the starting position above respective female and male mold halves. Gripper 1 is a male gripper and comprises a male ring member 10 and a male gripper member 11, which are arranged above a female mold half 3. Correspondingly, gripper 2 is a female gripper and comprises a female ring member 20 and a female gripper member 21 which is arranged above a male mold half 4.

Both the male ring member 10 and the female ring member 20 are provided with a plurality of nozzles 100 and 200, respectively (see FIG. 2) which are distributed about the circumference of the respective male ring member 10 or female ring member 20, respectively. Each of the nozzles 100 and 200 has an outlet opening which is directed towards the female mold half 3 and the male mold half 4, respectively. The male and female ring members 10 and 20 are provided with sealing member 101 and 201, respectively, which serves for fluid to escape as the ring member 100,20 is placed on the respective mold half 3,4, as will become evident further below.

Male gripper member 11 has a convex attachment surface 110 having holes 111 therein while female gripper member 21 has a concave attachment surface 210 having holes 211 therein. The holes 111 and 211 are adapted to apply suction (negative pressure) or overpressure (positive pressure) in order to engage and retain an ophthalmic lens such as a contact lens against the attachment surface 110 and 210, and to release the lens again at a later time in the process as will be explained in more detail below. Male and female gripper members 11,21 are provided with conduits or channels 112 and 212, respectively, which are connected to the holes 111 and 211 in the respective attachment surfaces 110 and 210, and fluid is delivered through these channels 112 and 212 whereby the suction or the overpressure can be applied to the holes 111 and 211, respectively.

The male and female ring members 10 and 20 are movable towards and away from the female and male mold halves 3 and 4, respectively, such that the ring members 10 and 20 can be placed on the respective female and male mold halves 3 and 4, respectively. This range of movement of the male and female ring members 10,20 is indicated in FIG. 1 by the double headed arrow MR. Thus, the ring members 10, 20 are movable in a first direction (vertically or in the Y-dimension in the depicted embodiments) between a first ring member position that is distal the mold halves 3, 4 (shown in example form in FIG. 1), and a second ring member position that is proximal the mold halves (shown in example form in FIG. 2).

The male and female ring members 10 and 20 are further provided with central openings 103 and 203, respectively (see FIG. 1). The respective male and female gripper members 11,21 are movable through these central openings 103 and 203 towards and away from the female and male mold halves 3,4. This range of gripper member movement is indicated in by the double headed arrow MG. Thus, the gripper members 11, 21 are movable in the first direction (coaxially or in parallel alignment with the above-described motion of the ring members) between a first gripper position apart from the ring members 10, 20 and apart from the mold halves 3, 4 (shown in example form in FIGS. 1 and 2), and a second gripper position extending at least partially through the central openings 103, 203 of the ring members and adjacent the mold halves (shown in example form in FIG. 3). In addition, the male and female gripper members 11,21 are movable towards and away from a deposition position, in a second direction generally perpendicular or transverse to the first direction (i.e., horizontally or in the X-dimension in the depicted embodiments) which is indicated in FIG. 1 by the double headed arrow MD, as will be described in more detail below.

Figure 2:
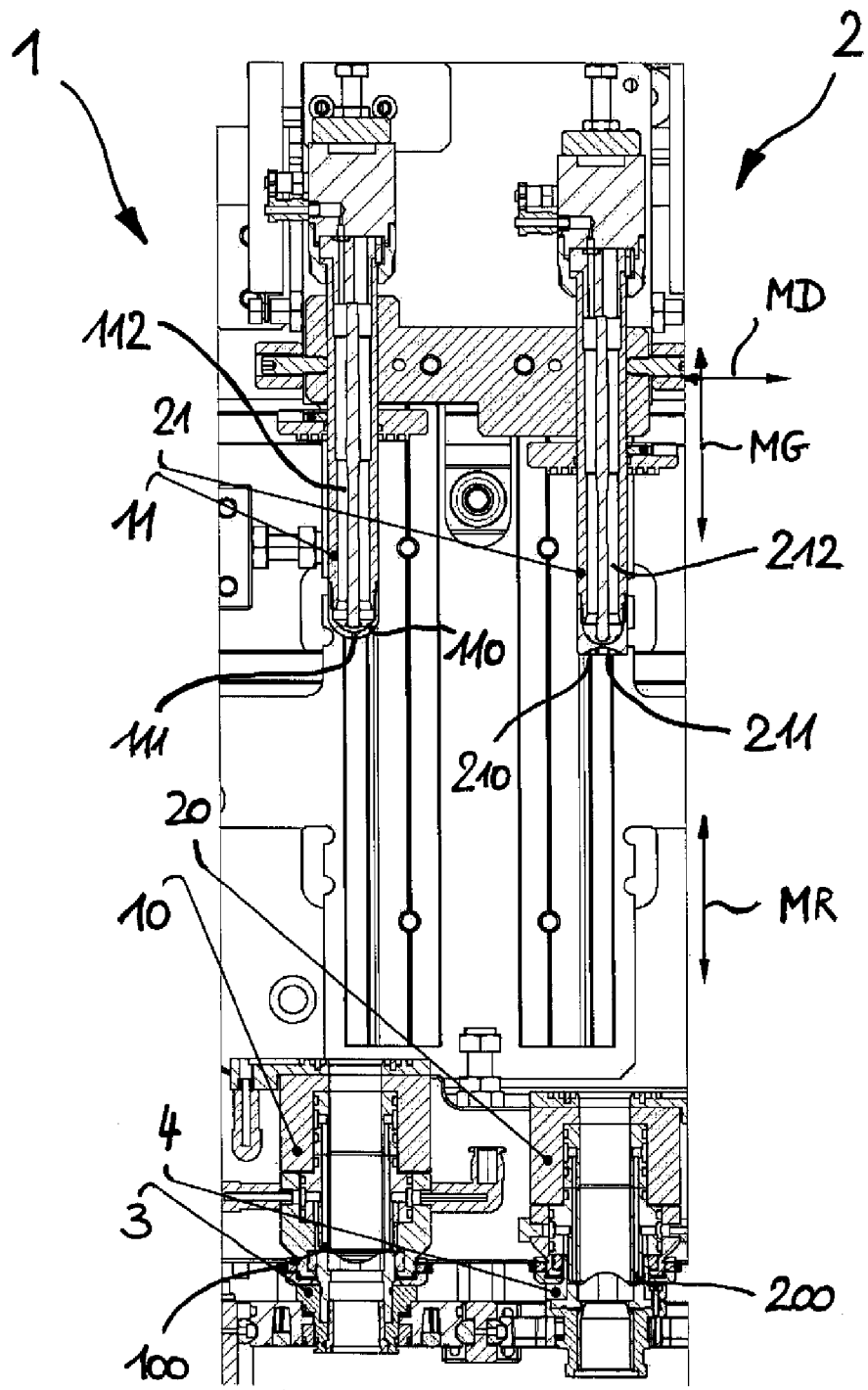
FIG. 2 shows the apparatus of FIG. 1 with the (nozzle) ring members in their lowermost position placed on the respective mold halves.

In an example mode of operation of the pair of grippers 1,2, the male and female ring members 10 and 20 of male and female grippers 1,2 are initially arranged in the starting position. This position is shown in FIG. 1, where both the male and female ring members 10 and 20 are arranged above the respective female and male mold halves 3,4. The male and female ring members 10 and 20 are then moved downwardly until they are placed on or around the respective female and male mold halves 3,4. For the sake of better understanding, let us now assume that an ophthalmic lens, e.g. a contact lens (not shown) is adhering to each of the male and female mold halves 3,4. In FIG. 2 the male and female ring members 10 and 20 are placed on the respective female and male mold halves 3,4.

Figure 3:
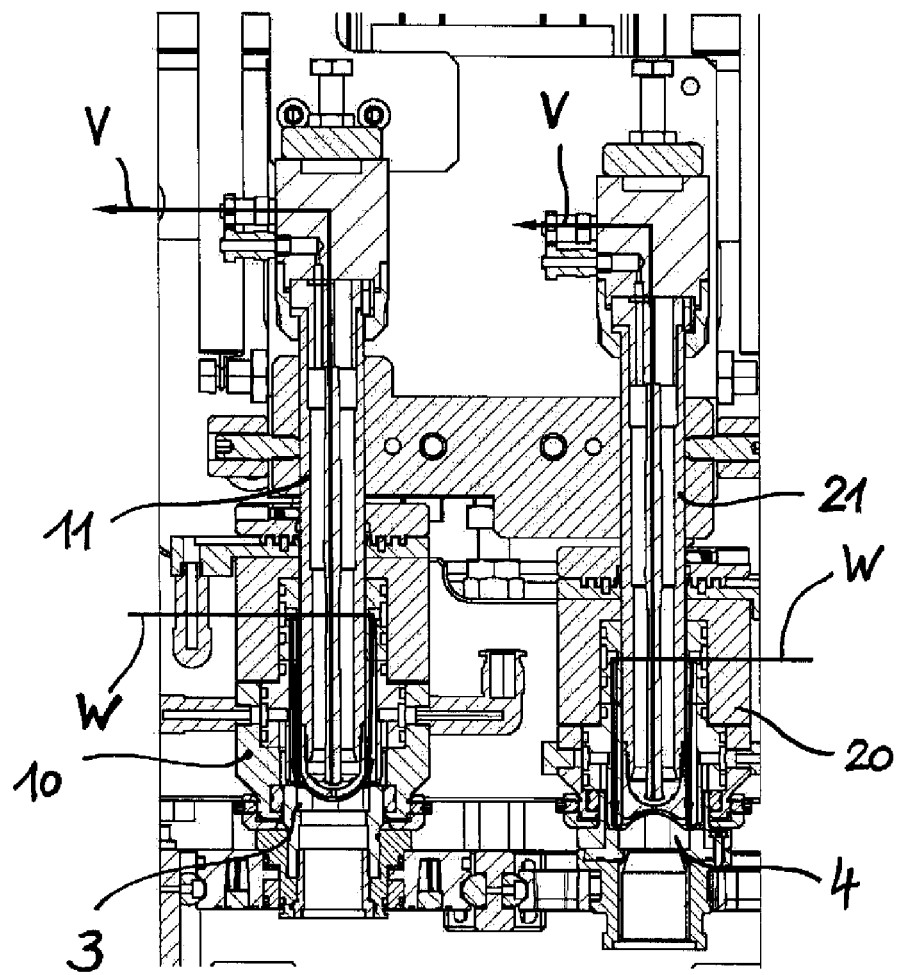
FIG. 3 shows the apparatus of FIG. 1 with the (nozzle) ring members and with the gripper members in their pick-up position (lowermost position)

The male and female gripper members are then moved downwardly until they are arranged directly adjacent to the female and male mold halves 3,4 in a pick-up position. This situation, where the male and female ring members 10 and 20 are placed on the female and male mold halves 3,4, and where further the male and female gripper members 11 and 21 are arranged in the pick-up position, is shown in FIG. 3. In this position, a negative pressure or suction V (vacuum) is applied to the openings 111 and 211 in the attachment surfaces so that the gripper members 11 and 21 are capable of sucking the contact lens into engagement against the attachment surfaces. However, at that time the respective contact lens may still adhere to the respective mold half 3 and 4, respectively. In order to loosen the respective lens from the mold half to which it adheres, a fluid such as water W is applied to the respective mold half through the outlet openings of the nozzles 100 and 200 of the ring members, respectively. Alternatively, air can be used instead of water. Once a jet or pulse of water has been applied to the mold half and/or the lens, thereby loosening the lens from the mold half 3,4 to which it adheres, the suction applied through channels 112 and 212 to the respective openings 111 and 211 causes the respective lens to be suctionally engaged against the attachment surfaces 110 and 210 of gripper members 11 and 21.

Once the respective lens has been suctionally engaged against the attachment surface 110,210 of the respective gripper member 11 and 21, application of the jet or pulse of water through the nozzles 100 and 200 is preferably terminated while the application of suction V through the channels 112 and 212 is preferably continued so as to keep the lens attached to the respective attachment surface. The respective gripper member 11 and 21 is now moved upwardly through the respective central opening 103 and 203 of the respective ring member 10,20 together with the lens which is still attached to the attachment surface 110,210 of the respective gripper member 11,21. The corresponding ring member 10,20 is then moved upwardly back to its respective starting position, so that the ring members 10,20 and the gripper members 11,21 are in their starting position again (see FIG. 1). It is to be mentioned, however, that the lens still adheres to the attachment surface of the respective gripper member 11,21 due to the continued application of suction V and/or by surface tension or adhesion.

Since the ring members 10,20 have also been raised back to their starting position, the "empty" mold halves 3,4 can be transported away from the position underneath the grippers 1,2, so that they can be cleaned and reused, for example. Also, the next mold halves carrying lenses can then be moved into position underneath the grippers 1,2 for sequential processing. After the lenses presently attached to the gripper members 11,21 have been deposited, the process cycle can start anew. The step of depositing the lens will be explained in more detail below.

Figure 4:
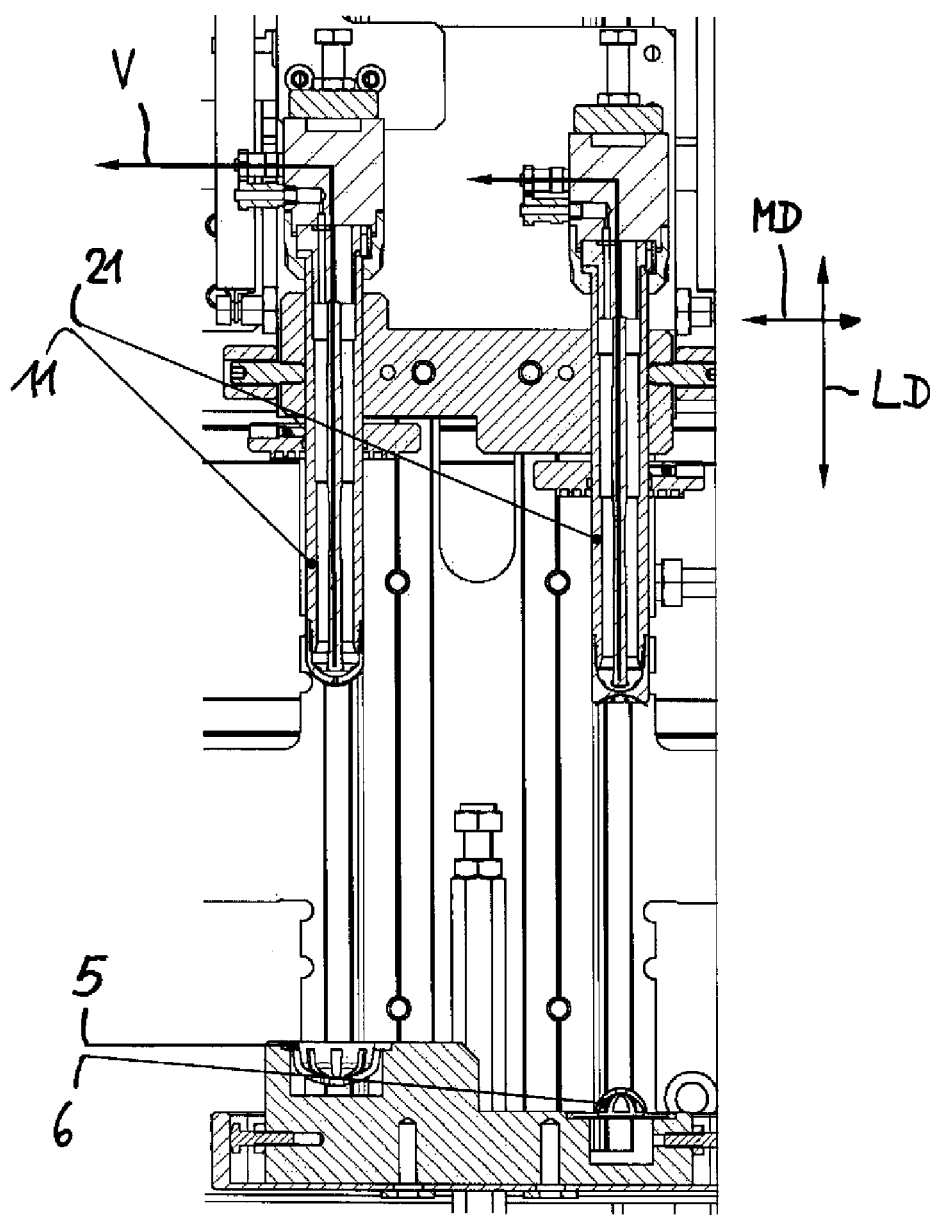
FIG. 4 shows the gripper members of the apparatus of FIG. 1 above a deposition position.
Figure 5:
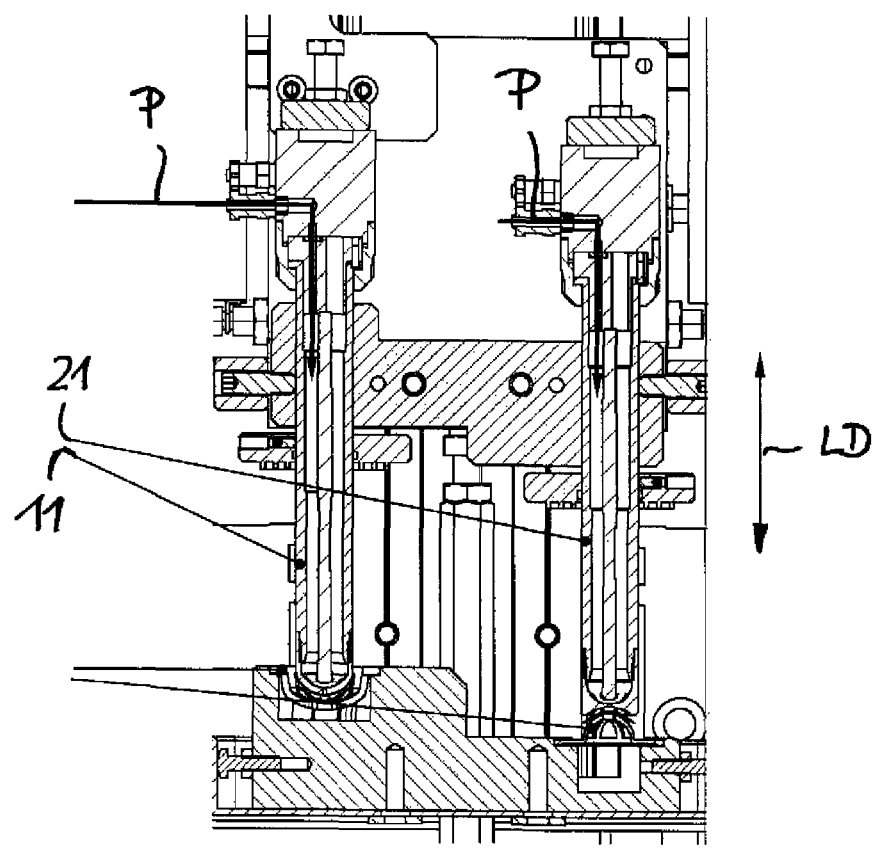
FIG. 5 shows the gripper members in the deposition position.

As mentioned further above, the gripper member together with lens attached thereto can be moved towards a deposition position. This movement is indicated in FIG. 1 and in FIG. 2 by arrow MD. The gripper members 11,21 with the lens attached thereto are shown in FIG. 4 in the position where deposition is to occur, with the gripper members 11,21 still being in the raised position. In order to deposit the respective lens in a container (or on a carrier) which may be a female or male container 5,6 (or a female or male lens carrier), the gripper members 11,21 are moved downwardly to the deposition position shown in FIG. 5, in which they are arranged directly adjacent the respective container 5,6 (or carrier). This possible movement is indicated by the double-headed arrow LD. At this point of time, suction V is terminated and/or overpressure P is applied via delivery of a suitable fluid (e.g. air or water) through openings 111, 211 via the fluid conduits or channels 112, 212 so as to release the lens from the attachment surfaces of the respective gripper member 11,21 and to insert it into or onto the respective container or carrier for further processing.

The gripper members 11,21 can then be raised again and moved back to their initial starting position (see FIG. 1) and the described cycle can then start anew. The various components of the grippers 1,2 are preferably made from a material which is resistant to corrosion, e.g. they are made from stainless steel or from a suitable plastics material. In example embodiments, the pressure with which water is applied through the outlet openings of the nozzles 100,200 in order to loosen the lens may be in the range of 1 to 4 bar, while the overpressure P of the fluid for releasing the lens from the gripper members 11,21 may be in the range of from 0.2 to 1 bar.

As has been mentioned above, the grippers 1,2 can be advantageously used in a highly automated process for producing contact lenses in order to automatically remove the lenses from the mold halves, even if these lenses are made from a material such as silicon hydrogels which tend to strongly adhere to the mold halves.

While the invention has been described with reference to preferred and example embodiments, it will be understood by those skilled in the art that a variety of modifications, additions and deletions are within the scope of the invention, as defined by the following claims.

The invention claimed is:

1. An apparatus configured to remove an ophthalmic lens from a mold half, comprising:
a ring member configured to be movable towards and away from the mold half, the ring member comprising a central opening and a plurality of nozzles circumferentially distributed about the ring member, each nozzle having an outlet opening directed towards the mold half as the ring member is placed on the mold half, and wherein the ring member further comprises a sealing member configured to provide a seal for the mold half preventing fluid from escaping as the ring member is placed on the mold half; and
a gripper member configured to be movable towards and away from the mold half through the central opening of the ring member.

2. The apparatus according to claim 1, wherein the gripper member comprises an attachment surface which is provided with holes and a channel which is connected to and in fluid communication with the holes provided in the attachment surface configured to allow suction or overpressure to be applied for gripping or releasing the ophthalmic lens.

3. The apparatus according to claim 1, wherein the ring member and the gripper member are made from a material which is resistant to corrosion, e.g. comprising stainless steel or plastic material.

* * * * *